United States Patent [19]

Wise

[11] Patent Number: 4,854,796

[45] Date of Patent: Aug. 8, 1989

[54] REVERSIBLE SCREW CLAMP FOR A GAPPED WALL

[75] Inventor: Robert D. Wise, Akron, Ohio

[73] Assignee: Century Products Company, Macedonia, Ohio

[21] Appl. No.: 106,081

[22] Filed: Oct. 7, 1987

[51] Int. Cl.$^4$ ............................................. F16B 35/00
[52] U.S. Cl. .................... 411/366; 411/427; 248/103; 248/231.1
[58] Field of Search ............ 411/366, 389, 427, 435, 411/436, 908, 237; 5/97, 508; 248/103, 104, 231.1, 231.6, 225.31; 16/121

[56] References Cited

U.S. PATENT DOCUMENTS

| | | | |
|---|---|---|---|
| 2,183,332 | 12/1939 | Haritos | 248/104 |
| 2,435,466 | 2/1948 | Thomas | 411/389 X |
| 3,053,357 | 9/1962 | Stanger | 411/427 |
| 3,368,443 | 2/1968 | Faul | 411/427 |
| 3,379,090 | 4/1968 | Parkin | 411/427 |
| 4,216,695 | 8/1980 | Hoshino | 411/435 X |
| 4,573,654 | 3/1986 | Nottingham | 248/103 X |
| 4,636,125 | 1/1987 | Burgard | 411/389 |

FOREIGN PATENT DOCUMENTS

| | | | |
|---|---|---|---|
| 2852034 | 5/1979 | Fed. Rep. of Germany. | |
| 367023 | 2/1932 | United Kingdom | 5/508 |
| 962666 | 7/1964 | United Kingdom | 411/237 |

Primary Examiner—Rodney M. Lindsey
Attorney, Agent, or Firm—Townsend and Townsend

[57] ABSTRACT

A screw clamp for a gapped wall such as a parallel-rail side wall of a baby's crib is designed to include a block with a screw extending from one side to pass through the gap in the wall, and a knob threaded to mate with the end of the screw emerging through the gap. The knob is reversible, with a threaded recess on one side and a protruding hollow shaft with a threaded interior on the other, to accommodate a wide range of wall thicknesses or rail widths.

3 Claims, 3 Drawing Sheets

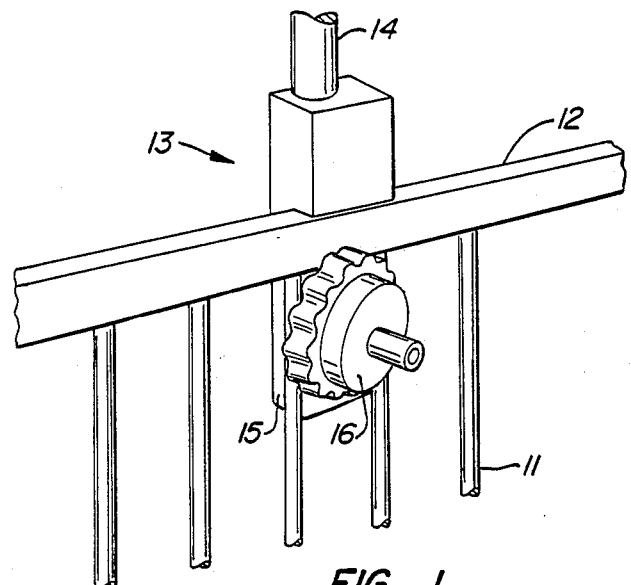
FIG._1.
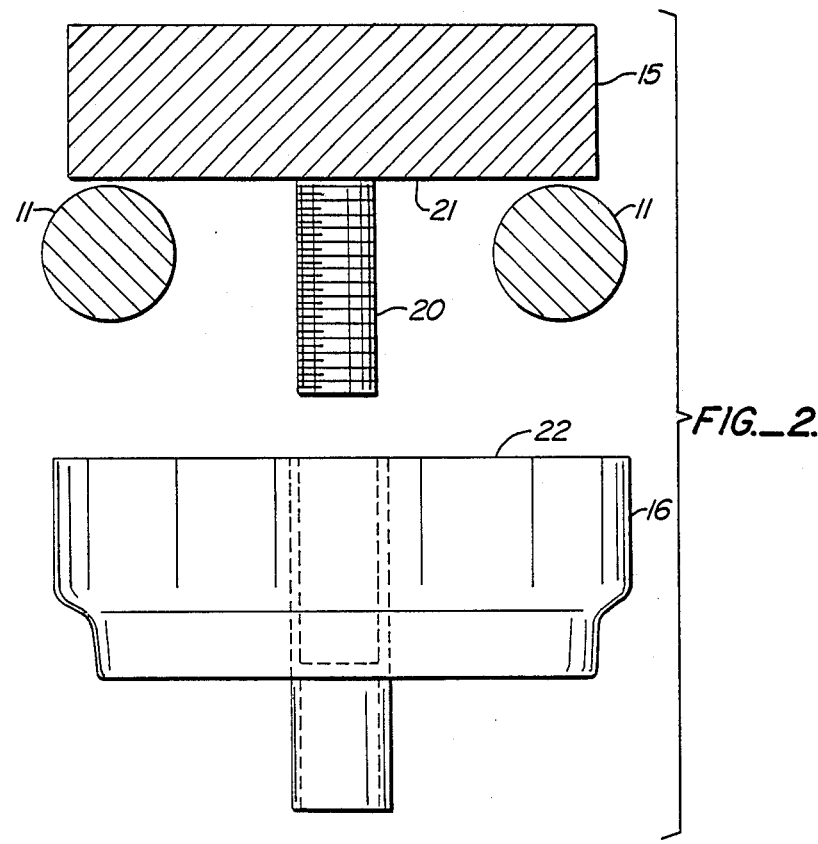
FIG._2.

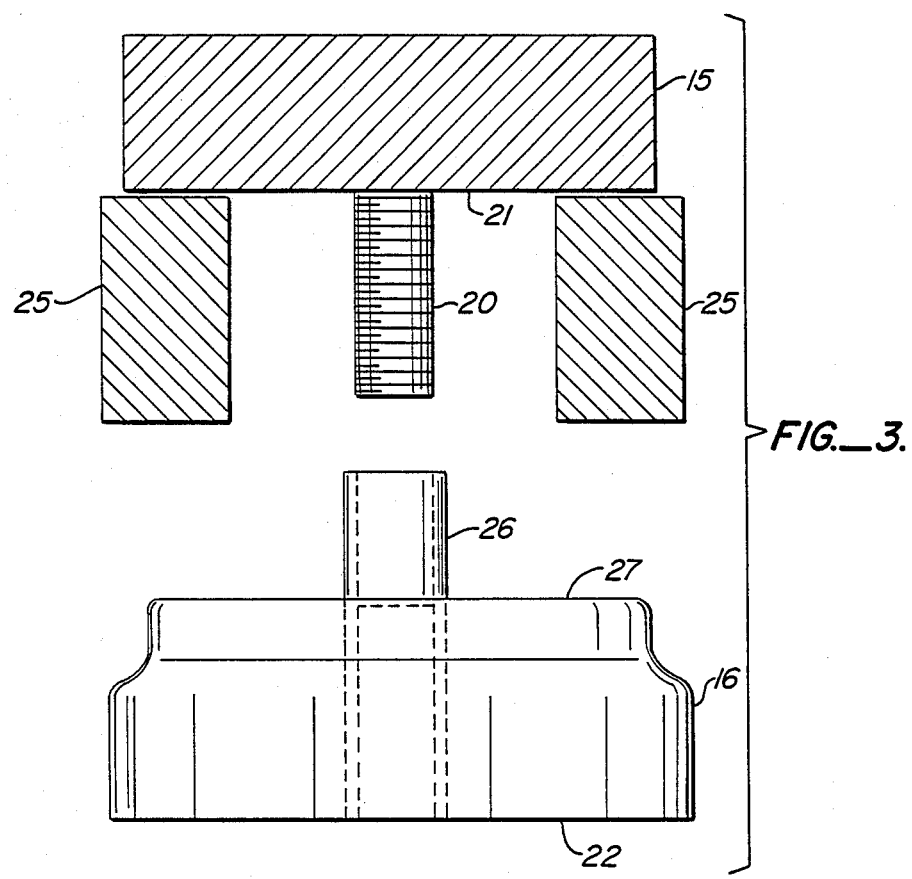
FIG._3.

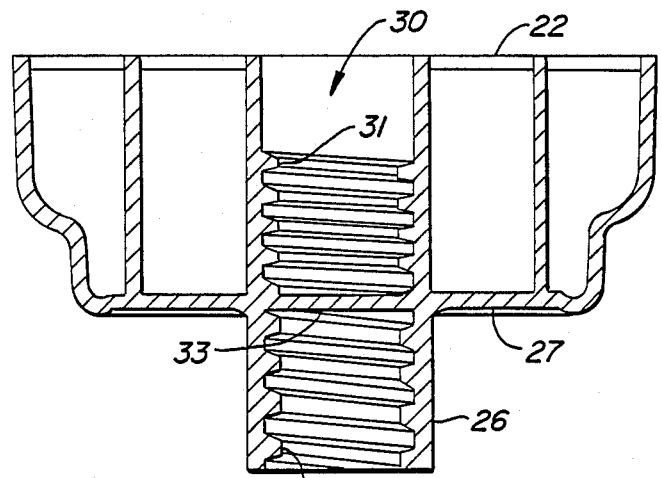
FIG._4.
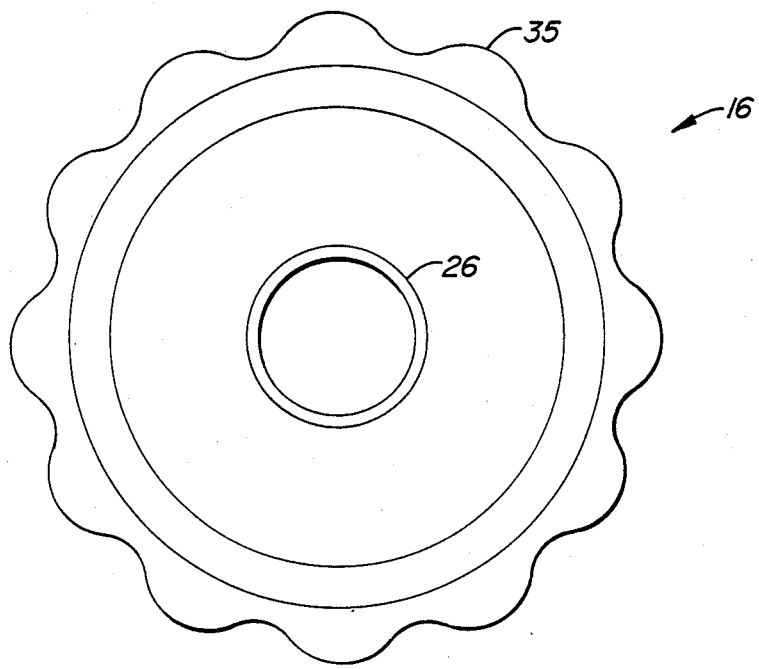
FIG._5.

REVERSIBLE SCREW CLAMP FOR A GAPPED WALL

BACKGROUND AND SUMMARY OF THE INVENTION

The present invention relates to manually operated clamps, and in particular to clamps used in securing an object to a gapped wall, or one formed from parallel rails or slats, such as the side wall of a crib.

It is frequently desirable to secure an object to the side wall of a crib. The object may serve a functional purpose to the tending adult or an amusement purpose to the infant in the crib. An example of the latter is a dangling toy suspended above the crib by a support arm, the toy being capable of bobbing up and down, rotating, swinging back and forth, or making some pleasant noise to keep the infant amused.

The present invention provides a clamping device which can be used to secure an object to any gapped wall, including a parallel-rail side wall of a crib, through the gap or space between the rails. The aim of the present invention is to provide such an attachment which can be used over a wide range of rail thicknesses or wall thicknesses. As in previous attachments of this type, the device has two parts—a fixed part with a screw extending outward to penetrate the gap or space between the rails, and a knob threaded to mate with the screw. To secure the device to the wall, the fixed part is placed against the wall with the screw extending through the gap, and the knob is screwed over the end of the screw emerging through the gap and tightened down. The width adjustment effect in accordance with the present invention resides in the reversible construction of the knob, permitting it to be screwed on from either side. In one side, the threads are in a recess while in the other the threads are in the interior of the raised portion which itself is small enough to pass through the gap.

The advantage of the present invention is that the knob can accommodate a wide range of rail thicknesses without leaving the end of the screw exposed. Previously, an exceptionally long screw was needed to provide the variation. With thin rails, the screw would protrude a considerable distance into the crib space and present a hazard to the infant inside. The knob construction according to the present invention can achieve the same variation with minimal protrusion into the crib interior.

Other features and advantages of the invention will become apparent from the following description.

BRIEF DESCRIPTION OF THE DRAWINGS

FIG. 1 is a perspective view of a side rail of a baby crib with a device forming one embodiment of the present invention attached.

FIG. 2 is an upper view of the device and crib rails of FIG. 1 in partial cutaway, shown with the parts separated and the knob facing in one direction.

FIG. 3 is a view similar similar to FIG. 2, except with thicker rails and the knob facing in the other direction.

FIG. 4 is a sectional view of the knob shown in FIGS. 2 and 3.

FIG. 5 is a top view of the same knob.

DETAILED DESCRIPTION OF THE INVENTION AND PREFERRED EMBODIMENTS

The gapped wall shown in FIG. 1 is the side wall of a baby's crib, consisting of a series of vertical bars 11 and a top rail 12. The securing device 13 rests on the top of rail 12 and clamps to two of the bars. The securing device supports a shaft 14, which is the object sought to be attached to the crib rail, and may terminate in a dangling toy or some similar feature as indicated above.

The two parts of the securing device are a block 15 which supports the screw (not visible in FIG. 1), and the knob 16 which fits over the screw.

FIG. 2 shows the securing device of FIG. 1 from above, with the block 15 and the rails of the crib 11 in sectional representation. The screw 20 extends from the block 15 to enter the space between the rails 11, to be joined with the knob 16 on the other side. The rails of this figure are of a lesser thickness than the length of the screw 20, and the knob is oriented as shown. When the parts are secured together, the rails 11 are compressed between the inneer surface 21 of the block 15 and one of the flat faces 22 of the block 16.

FIG. 3 offers the same view of the same securing device, as it might be applied to rails of greater thickness 25. Here, the screw 20 is of lesser length than the thickness of the rails 25, and the knob 16 is turned over before it is screwed on to the screw. In this arrangement, the screw 20 enters a hollow shaft 26 which is internally threaded to meet with the threads of the screw 20, the hollow shaft being sufficiently narrow to pass into the gap between the rails 25. In this arrangement, when the parts are assembled, the rails 25 are compressed between the inner surface 21 of the block and the second flat face 27 of the knob, on the side opposite that of the first flat face 22.

Turning now to FIG. 4, the interior of the knob may be seen. At the center of the knob at its first face 22 is a recess 30 which has internal threads 31. Extending from the opposite face 27 is the hollow shaft 26, which also has internal threads 32. Both sets of threads are in the same direction and are equally mated to the screw shown in the preceding figures. A dividing wall 33 separates the recess 30 from the interior of the hollow shaft 26. It will be noted in this embodiment that the recess and the hollow shaft are both cylindrical, with equal nominal internal diameters, and are both co-axial.

As can be seen in FIG. 5, the knob itself is generally circular, although the side wall 35 is rippled to facilitate a manual grip. The first and second flat faces 22, 27 of the knob are also generally circular, and in the preferred embodiment as shown, the first and second faces, and the recess and hollow shaft are all co-axial.

The foregoing is offered primarily for purposes of illustration. It will be readily apparent to those skilled in the art that variations and modifications of the elements of the invention as described above may be made without depariang from the spirit and scope of the invention.

What is claimed is:

1. A reversible attachment for securing an object to a gapped wall, comprising:
    a block having a threaded screw extending therefrom, said block and screw forming a single piece; and
    a knob terminating in first and second substantially flat external faces in opposing relation, a recess in said first face, a hollow shaft protruding from said second face, said recess and said hollow shaft each being internally threaded to mate with said threaded screw, and a wall separating said recess from the interior of said hollow shaft.

2. A reversible attachment in accordance with claim 1 in which said recess and said hollow shaft are cylindrical and are substantially coaxial.

3. A reversible attachment in accordance with claim 1 in which said first and second faces are generally circular and said recess and said hollow shaft are cylindrical, and said first and second faces, said recess, and said hollow shaft are substantially coaxial.

* * * * *